United States Patent
Finley et al.

[15] 3,659,315
[45] May 2, 1972

[54] PROCESS OF CLAM EVISCERATION

[72] Inventors: Ronald K. Finley, Towson; Donald J. Langlois, Pasadena, both of Md.; Robert H. Nicholson, Lewes, Del.

[73] Assignee: HCA Food Corporation, Baltimore, Md.

[22] Filed: Nov. 5, 1970

[21] Appl. No.: 87,293

[52] U.S. Cl. ........................................................146/222
[51] Int. Cl. ..........................................................B01d 43/00
[58] Field of Search..................17/53, 45, 48, 51, 52, 65; 99/111; 146/222

[56] References Cited

UNITED STATES PATENTS

| | | |
|---|---|---|
| 1,011,378 | 12/1911 | Shaffer .................................17/65 |
| 2,808,612 | 10/1957 | Snow ....................................17/53 |
| 2,828,018 | 3/1958 | Chayen ...............................146/222 |
| 3,471,300 | 10/1969 | Wendt ..................................99/111 |

Primary Examiner—Lucie H. Laudenslager
Attorney—Roylance, Abrams, Berdo and Kaul

[57] ABSTRACT

A method for effecting the separation of visceral material from shucked clams is disclosed. Clean clam meat in essentially viscera-free form is obtained by subjecting shucked uneviscerated clam pieces to agitation in a hot aqueous medium for a controlled period of time. As a result of this step, the visceral material is transferred to the liquid medium and remains as a fully liquid body which can be separated from the pieces of clam meat. The recovered clam pieces may then be washed to remove any residual liquid or small fragments which remain on the surfaces of the pieces.

7 Claims, No Drawings

PROCESS OF CLAM EVISCERATION

This invention relates to the production of clean, edible clam meat and, more particularly, to a unique process for effecting the separation of visceral material from shucked clams.

As is well known in the art, the processing of clams involves the steps of removal of the meat from the shell, referred to as "shucking" of the clams, followed by the removal of the belly contents from the shucked clams. In recent years, prior-art workers have proposed a variety of mechanical and other techniques for processing clams. This is particularly true in the case of techniques for shucking or removing the shells from clams. Thus it has been proposed, for example, to employ various mechanical means which subject the shells to crushing or abrading operations. It has also been proposed to employ such mechanical means in combination with heat treatment of the clams, the latter serving to facilitate removal of the clam meat from the clam shell. In more recent years, it has also been proposed to employ enzymes, or a combination thereof, for loosening and/or removing the edible tissue or meat from the shells, as well as to effect (or aid in) the separation of the belly contents or visceral material from the shucked uneviscerated clam meat.

Despite prior-art efforts, processing of clams on a commercial basis is still done by procedures depending on manual labor. In the case of debellying, operators manually tear the belly away and wash the debellied clam. This is obviously an operation too tedious, time-consuming and costly to be acceptable under present economic conditions.

Stated generally, this invention provides a highly efficient and simplified method for separating the visceral material, i.e., the "belly" and contents, from whole clams. The invention is based on the discovery that clean clam meat can be recovered in essentially viscera-free form by subdividing the shucked clams and subjecting the pieces to agitation in a hot aqueous medium for a controlled period of time, with the result that the visceral material, being exposed by subdivision of the clam, is disrupted hydraulically and distributed through the aqueous medium by solution and dispersion. As a result of the agitation step, the visceral material is transferred to the liquid medium and, through the solution and dispersion of the visceral material results in a thickening of the aqueous medium. The aqueous medium remains as a fully liquid body which can be readily separated from the pieces of clam meat, with the clam pieces then being recoverable as clean, essentially viscera-free pieces by simply washing away such residual liquid and fragments as may remain on the surfaces of the pieces.

It is accordingly a general object of this invention to provide a process for producing clean, eviscerated clam meat from shucked clams, said process not subject to the disadvantages of prior techniques.

Another and more particular object is to provide a highly efficient and simplified process for effecting separation of visceral material from clam meat, which method eliminates the need for manual operations and the disadvantages associated therewith.

Still another object is to provide a process for converting normally inedible clams into edible clams suitable for human consumption.

Still another object is to provide a unique process for producing clean, edible clam pieces in essentially viscerafree form from chopped, shucked pieces of uneviscerated clam meat.

The manner in which the foregoing and other objects are achieved in accordance with the present invention will be better understood in view of the following detailed description wherein particularly advantageous method and composition embodiments have been disclosed for illustrative purposes.

As briefly discussed above, the present invention is based on the unexpected discovery that clean clam meat, in essentially viscera-free form can be obtained by subjecting pieces of shucked uneviscerated clam meat to agitation in a hot aqueous medium for a controlled period of time. In its broadest aspects, the method of the invention comprises subdividing, as by grinding, shucked uneviscerated clams into small pieces, subjecting the clam pieces to agitation in an aqueous medium maintained at a temperature in the range of from 100° to 150° F., continuing the agitation for a period of at least 5 minutes, separating the clam pieces from the aqueous medium and thereafter washing the recovered pieces to remove any residue of the liquid medium.

The method of the invention is applicable to clams generally and as used herein, the term "clam" is intended to include the generic class of clams referred to in the art as Pelecypoda and the wide variety of species thereof. Examples of such species include surf clams (*Spisula solidissima*), soft shell clams (*Mya arenaria*), mahogany or black quahogs (*Artica islandica*) and regular quahog clams (*Venus mercenaria*).

In practicing the method of the invention, the clams are first shucked, i.e., manually or mechanically removing the meat from the shell, in accordance with techniques well known in the industry. If desired the clams may first be heat treated to partially open the shell and facilitate separation of the meat from the shell.

After the clams have been shucked, the uneviscerated clam meat is chopped or cut into small pieces or slices. In general the size of the pieces is not critical. However, the chopping operation should be such that at least a part of each clam, including the belly portion or visceral material, is subdivided into pieces smaller than the belly portion. Stated differently the chopping operation should be such that the "peritoneum" of each clam is at least partially intersected so that the viscera or belly content is exposed in part. In this regard it has been found that small pieces on the order of about one-quarter inch by one-quarter inch to about 1 inch by 1 inch are particularly advantageous. Slices on the order of about ¼ inch by 2 inches in length may also be used. It should be understood that reference to a particular size is intended to refer to an "average," i.e., a given amount of chopped pieces may contain over and undersized pieces. Any suitable means or apparatus may be employed to chop or cut the clam meat into pieces.

Considering now the method of the invention in more detail, the pieces of uneviscerated clam meat are dispersed in an aqueous medium and subjected to agitation for a period of at least 5 minutes. The temperature of the aqueous medium should be maintained in the range of about 100° to 150° F., with preferred ranges being on the order of 110° to 130° F. To a considerable extent the invention is based on the discovery that in subjecting the shucked pieces to agitation, under the controlled conditions set forth herein, the visceral material is disrupted and transferred to the liquid medium as a solution and dispersion. As indicated above, the pieces of clam meat should be subjected to agitation for a period of at least about 5 minutes. It has been found that the agitation may be continued for a period of from 5 minutes to more than 2 hours, with the maximum or upper limit on the retention time being dictated only by practical or economical reasons. Preferred time periods are on the order of from about 5 to 30 minutes. While agitation must be maintained throughout this processing step, the particular mode or apparatus employed to maintain the agitation is not critical. For example, agitation may be effected by a conventional bladed stirrer or by injecting high pressure steam and/or air through the aqueous medium, etc.

The concentration or percent by weight solids, i.e., the chopped clam pieces, of the aqueous dispersion or slurry may vary widely with particularly advantageous results being obtained at concentrations in the range of about 30–70 percent by weight of the total system. Slurries less concentrated than 10 percent are not recommended for practical reasons whereas concentrations greater than 80 percent are difficult to agitate. From the above it will be seen that the concentration of the slurry is largely dependent upon process economics, the equipment employed, etc.

In carrying out the agitation step, any suitable apparatus, provided e.g., with means for maintaining the aqueous dispersion under agitation and for controlling the temperature of the dispersion, etc., may be employed. The method of the invention may be carried out batchwise or on a continuous basis. In the case of the latter, the shucked pieces of clam meat may be subjected to agitation e.g., in a tubular reactor provided with suitable baffles to insure intimate mixing, etc.

After the clam pieces have been subjected to agitation in the manner described above, they are separated from the aqueous medium and are washed under conditions to remove any residue of the visceral material. Preferably this step is conducted by passing the recovered clam pieces onto a vibrating perforated screen provided with spray or jet washers directed on the meat as it passes along the screen. However, again the particular equipment employed is not critical and any conventional washing equipment may be used. If desired the washing step may be conducted with water at ambient temperature so as to reduce the temperature of the clam pieces. The washed clam pieces are recovered and further processed, as by canning, in the conventional manner.

The invention will be further illustrated by the following examples which set forth particularly advantageous method embodiments. While the examples serve to illustrate the invention they are not intended to limit it thereto.

EXAMPLE 1

One-hundred pounds of shucked uneviscerated surf clams was ground to pieces of approximately one-quarter inch by one-quarter inch size in a conventional grinding machine. Approximately 100 gallons of water was preheated in a 150 gallon stainless steel jacketed vessel to 130° F., using 100 p.s.i.g. steam. The 100 pounds of ground clam meat, including the visceral material, was then immersed in the heated water in the stainless steel vessel and suspended by agitation. Steam was introduced into the outer jacket of the stainless steel vessel to maintain the temperature of the aqueous slurry at 130° F. plus or minus 2° F. Agitation was maintained by a three-bladed propeller stirrer. The suspension was then agitated for a period of about 8 minutes, after which the entire contents of the vessel were drained by gravity from the vessel and delivered onto a vibrating screen, with the liquid phase passing through the screen and the clam meat remaining thereon. The screen was equipped with 85 p.s.i.g. spray washers which were directed onto the meat as it passed along the screen. The essentially viscera-free clam meat delivered at the end of the screen was charged to a cylindrical washer to remove any remaining sand or grit. The clean eviscerated clam meat was then canned in the conventional manner followed by thermal processing. Comparison was made of the canned product of this example with that from clams that were debellied manually, by experts in the field. The comparison showed that the product of this example was superior to that obtained from manually debellied clams in that the latter product contained an observable proportion of visceral material while the product of this example was essentially vsicera-free. Further, the clam meat of this example was fully equal in all respects to that obtained from the manually debellied clams.

EXAMPLE 2

The procedure of Example 1 was repeated except that the temperature of the water was heated and maintained at 100° F. Comparison of the canned product of this example with that from clams that were debellied manually showed that the product of this example was superior to that obtained from manually debellied clams in the manner described in Example 1. In a series of further tests (4) the temperature of the water was heated and maintained at 110° F., 120° F., 140° F., and 150° F. The test results were identical with Example 1, i.e., the product of each test, as compared to manually debellied clams, was superior to the manually debellied clams in the manner described in Example 1.

EXAMPLE 3

In this Example, the procedure of Example 1 was repeated except that the water was heated and maintained at 50° F. The results were negative to the extent that a significant portion of the visceral material was not separated from the meat.

EXAMPLE 4

The procedure of Example 1 was repeated except that the aqueous medium was not agitated. The results were negative with little or no separation of the visceral material from the clam meat being effected.

EXAMPLE 5

The procedure of Example 1 was repeated except that mahogany clams (Artica islandica) were substituted for the surf clams of Example 1. The test results were identical to Example 1. In a further test, regular quahog clams (Venus mercenari) were treated following the procedure of Example 1. The test results were identical with that of Example 1.

EXAMPLE 6

In this test, 100 pounds of shucked uneviscerated surf clams, ground to pieces of approximately one-quarter inch by one-quarter inch, were dispersed in 25 gallons of water in a 50-gallon stainless steel vessel. The slurry was then continuously pumped through a series of three 2 feet O.D. by 8 feet long tubular reactors provided with internal baffles to insure adequate mixing. The temperature of the slurry in the reactors was maintained at 125° F. by introducing 100 p.s.i.g. steam in external jackets surrounding the reactors. The slurry was discharged continuously from the reactors onto a vibrating screen as described in Example 1. The clean eviscerated clam meat was canned and compared with clams that were debellied manually. The product of this Example was superior to that obtained from manually debellied clams in the manner described in Example 1.

EXAMPLE 7

The general procedure of Example 1 was repeated except that the clams were ground to pieces of about one-half inch by one-half inch size. The test results were identical to that of Example 1. In a further test, the size of the pieces was increased to 1 inch by 1 inch with equally good results as per Example 1.

What is claimed is:

1. A method for producing clean, edible clam meat from shucked uneviscerated clams comprising the steps of:
   chopping shucked uneviscerated clams into pieces,
   agitating said clam pieces in an aqueous medium,
      said aqueous medium being maintained at a temperature in the range of from about 100° F. to 150° F.,
      continuing said agitation for a period of time of at least about 5 minutes,
   separating said clam pieces from said aqueous medium,
   washing the recovered clam pieces under conditions to remove any remaining visceral material, and
   recovering the washed clam pieces in essentially viscera-free form.

2. A method in accordance with claim 1 wherein said aqueous medium is maintained at a temperature in the range of about 110°–130°F. and further comprising maintaining said agitation for a period of time from about 5 minutes to 30 minutes.

3. A method in accordance with claim ! wherein said shucked uneviscerated clams are subjected to a chopping operation such that at least a part of each clam including the belly portion is subdivided into pieces significantly smaller than the belly portion.

4. A method in accordance with claim 1 wherein said clam meat is selected from the group consisting of surf and mahogany clam meat.

5. A method for producing clean, edible clam meat from shucked uneviscerated clams comprising the steps of:

chopping shucked uneviscerated clams into pieces such that at least that part of each clam including the belly portion is subdivided into pieces significantly smaller than the belly portion, agitating said clam pieces in an aqueous medium,
said aqueous medium being maintained at a temperature in the range of from about 110°–140° F. and in a volume adequate to allow tumbling of said pieces, continuing said agitation for a period of time from about 5 minutes to 30 minutes, separating said clam pieces from said aqueous medium, washing the recovered clam pieces under conditions to remove the residue of the aqueous medium and to remove any remaining visceral material, said washing step being conducted with a liquid medium at a temperature in the range of about 25°–40° C., and recovering the washed clam pieces in essentially viscera-free form.

6. A method in accordance with claim 5 wherein said washing step is carried out by subjecting said recovered clam pieces to jets of water under pressure.

7. A method in accordance with claim 5 wherein said chopped clam pieces in said aqueous medium are present in an amount of from 10–70 percent by weight of the total system.

* * * * *

UNITED STATES PATENT OFFICE
CERTIFICATE OF CORRECTION

Patent No. 3,659,315          Dated May 2, 1972

Inventor(s) Ronald K. Finley et al

It is certified that error appears in the above-identified patent and that said Letters Patent are hereby corrected as shown below:

Herschel F. Porter, Lewes, Delaware, should be added as an inventor.

Signed and sealed this 2nd day of January 1973.

(SEAL)
Attest:

EDWARD M. FLETCHER, JR.           ROBERT GOTTSCHALK
Attesting Officer                 Commissioner of Patents